US011863220B2

(12) United States Patent
Vazirani

(10) Patent No.: US 11,863,220 B2
(45) Date of Patent: Jan. 2, 2024

(54) CONTROLLING REFLECTED SIGNALS

(71) Applicant: Comcast Cable Communications, LLC, Philadelphia, PA (US)

(72) Inventor: Deven Vazirani, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 18 days.

(21) Appl. No.: 17/678,601

(22) Filed: Feb. 23, 2022

(65) Prior Publication Data
US 2023/0268946 A1 Aug. 24, 2023

(51) Int. Cl.
*H04B 1/00* (2006.01)
*H04B 1/10* (2006.01)

(52) U.S. Cl.
CPC .................. *H04B 1/1081* (2013.01)

(58) Field of Classification Search
CPC .... H04B 1/1081; H04B 1/0057; H04B 1/006; H04B 1/10; H04B 2001/3811; H04B 1/525
See application file for complete search history.

(56) References Cited

U.S. PATENT DOCUMENTS

| | | | |
|---|---|---|---|
| 8,233,500 B2* | 7/2012 | Beser ...................... | H04L 47/10 370/468 |
| 8,659,987 B2* | 2/2014 | Hartman, Jr. ......... | H04L 1/0025 370/344 |
| 9,137,740 B2* | 9/2015 | Stanforth .............. | H04W 48/14 |
| 2003/0016771 A1 | 1/2003 | Nuutinen et al. | |
| 2021/0067186 A1 | 3/2021 | Beaudin et al. | |
| 2021/0159887 A1 | 5/2021 | Tomita et al. | |

* cited by examiner

*Primary Examiner* — Tuan Pham
(74) *Attorney, Agent, or Firm* — Banner & Witcoff, Ltd.

(57) ABSTRACT

A network access device placed between one or more distribution devices and multiple premises may remotely or wirelessly monitor and/or analyze signal characteristics at the network access device and or of equipment at the multiple premises. The network access device may adjust switchably-filtered signal paths between the distribution device(s) and the multiple premises to remove or mitigate signal interference.

17 Claims, 10 Drawing Sheets

CONTROLLING REFLECTED SIGNALS

BACKGROUND

Use of higher band split nodes to expand upstream bandwidth in a network may cause interference, for example, due to reflected signals communicated to devices such as video devices and broadband gateways. Imperfect isolations of the upstream bandwidth from downstream bandwidth may cause signal leakages and interference. Installing filters at multiple premises to block signal leakages may require a technician visiting every premises, which visits may need to be repeated as conditions change. Alternatively, upgrading all devices to the high-band split nodes may be prohibitively expensive and operationally challenging. These and other deficiencies are identified and addressed in the disclosure.

SUMMARY

The following summary presents a simplified summary of certain features. The summary is not an extensive overview and is not intended to identify key or critical elements.

Systems, apparatuses, and methods are described for adjusting, by a network access device, such as a wired or wireless line tap, that may be located between one or more distribution devices and computing devices at multiple premises that are served by a distribution network, one or more signal paths. The adjustment(s) may comprise adding or removing filters from the one or more signal paths or interrupting the one or more signal paths. The network access device may be configured to receive data from the premises computing devices that indicates signal characteristics and to analyze that data to determine signal path adjustments. Also or alternatively, the network access device (e.g., a line tap) may be configured to determine signal path adjustments by sending signal characteristic data to another computing device (e.g., a computing device at a distribution network facility and/or a wireless computing device of a technician servicing the network access device). That other computing device may analyze the data and send indications of the adjustment(s) to the network access device. Signal path adjustments may remove or mitigate signal interference, experienced at premises computing devices operating at a lower band split, caused by newer equipment operating at a higher band split. The network access device may allow gradual upgrade of the premises computing devices and/or reducing the need for on-site service.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
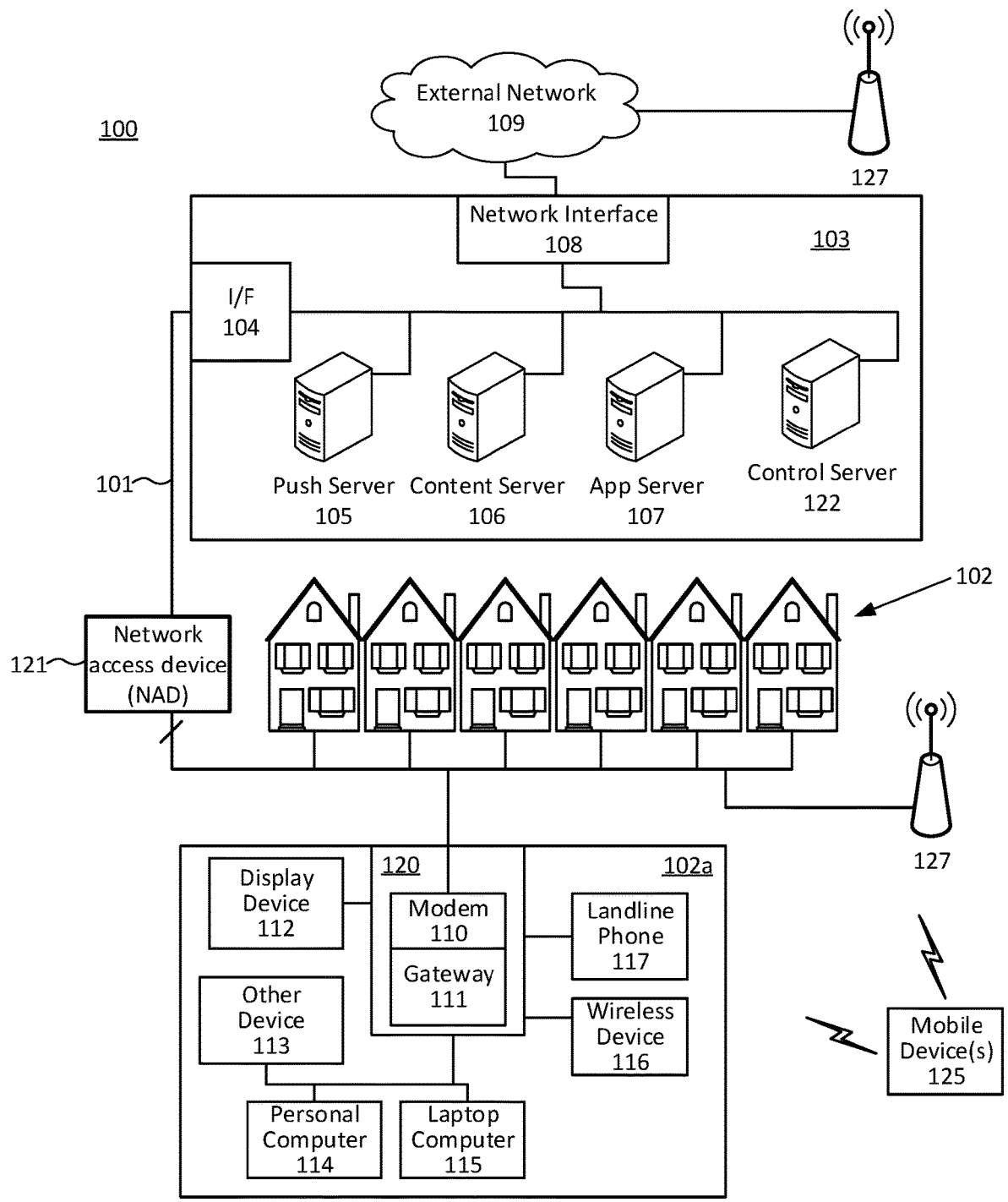
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a distribution network facility 103 (e.g., a headend). The distribution network facility 103 may send downstream information signals and receive upstream information signals via the communication links 101. Each of the premises 102 may comprise devices, described below, to receive, send, and/or otherwise process those signals and information contained therein.

The communication links 101 may originate from the distribution network facility 103 and may comprise components not shown, such as splitters, filters, amplifiers, etc., to help convey signals clearly. For example, the communication links 101 may comprise a hybrid fiber/coaxial (HFC) cable network. The HFC network may include a splitter for isolating upstream (US) signals from downstream (DS) signals, as described with examples in FIGS. 3A, 3B, and 3C. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The distribution network facility 103 may comprise one or more distribution devices. Distribution devices may comprise an interface 104. The interface 104 may comprise one or more computing devices configured to send information downstream to, and to receive information upstream from, devices communicating with the distribution network facility 103 via the communications links 101. The interface 104 may be configured to manage communications among those devices, to manage communications between those devices and other distributions devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS), an integrated cable modem termination system (I-CMTS), or virtual cable modem termination system (vCMTS)), one or more digital subscriber line access modules (DSLAMs), and/or any other computing device(s). The distribution network facility 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The distribution network facility 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The distribution network facility 103 may comprise additional servers, such as a network access device (NAD) control server 122 (described below), additional push, content, and/or application servers, and/or other types of servers. Although shown separately, the push server 105, the content server 106, the application server 107, the NAD control server 122 and/or other server(s) may be combined, and/or servers described herein may be distributed among servers or other devices in ways other than as indicated by examples included herein. Also or alternatively, one or more servers (not shown) may be part of the external network 109 and may be configured to communicate (e.g., via the distribution network facility 103) with other computing devices (e.g., computing devices located in or otherwise associated with one or more premises 102). Any of the servers 105-107, and/or 122, and/or other computing devices may also or alternatively be implemented as one or more of the servers that are part of the external network 109. The servers 105, 106, 107, and 122, and/or other servers, may be computing devices and may comprise memory storing data and also storing computer executable instructions that, when executed by one or more processors, cause the server(s) to perform steps described herein.

The NAD control server 122 may communicate with a network access device (NAD) 121. The NAD 121 may be installed between the distribution network facility 103 and multiple premises 102. For example, the NAD control server 122 may send a request to the NAD 121 for monitoring, via a number of ports of the NAD 121, conditions (e.g., power level of signal, noise level of signal, etc.) affecting devices in the multiple premises 102. The NAD 121 may (e.g., in response to communications from the NAD control server 122 and/or other computing device(s)) provide information including, for example, transmission power level, modulation error rate (MER), bit error rate (BER), etc. The NAD 121 may include a plurality of ports 1-n. The ports 1-n may connect to n corresponding premises 102. The NAD control server 122 may determine and request appropriate actions by the NAD 121, for example, based on the information, to mitigate and/or remove signal interference. For example, the NAD 121 may filter or disable a port n in response to a request from the NAD control server 122.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the distribution network facility 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the distribution network facility 103 and/or with other devices beyond the distribution network facility 103 (e.g., via the distribution network facility 103 and the external network(s) 109). The gateway 111 may comprise a set-top box (STB), digital video recorder (DVR), a digital transport adapter (DTA), a computer server, and/or any other desired computing device. The gateway 111, and/or another computing device at a premises 102, may interface with the NAD 121. The NAD 121 may send a request to the premises computing device, for example, to provide information on different upstream and/or downstream channels. In response to the request, the premises computing device may provide information, for example, including signal-to-noise ratio (SNR), modulation error ratio (MER) on the upstream and/or downstream channels.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
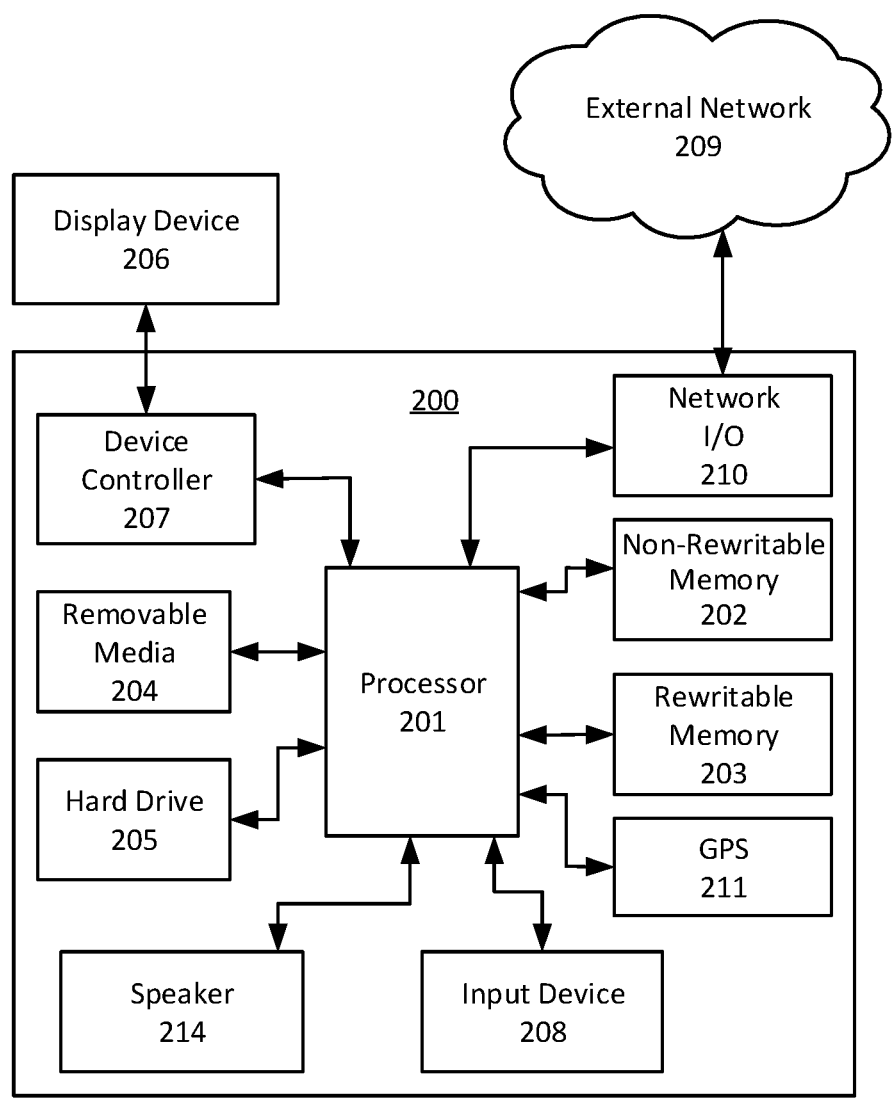
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the distribution network facility 103, any of the wireless access points 127, any devices associated with the external network 109) and any other computing devices discussed herein (e.g., the NAD 121 and/or the controller 430 of the NAD 121, the NAD control server 122, the wireless computing device 480, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH, BLE (Bluetooth Low Energy), ZigBee, or HaLow/LoRaWAN transceivers. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

The computing device 200 (e.g., the NAD 121) may also comprise a spectrum analyzer with a wide range of spectrum (e.g., 5-1794 MHz). The spectrum analyzer may be used to detect signal issues, for example, signal interference affecting computing devices in the multiple premises 102.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Bandwidth of a communication medium may be allocated. For example, part of a communication medium bandwidth may be allocated as upstream bandwidth (e.g., to be used for upstream communications) and part of the communication medium bandwidth may be allocated as downstream bandwidth (e.g., to be used for downstream communications). For example, a computing device (e.g., a computing device located at a premises such as the premises 102) may be configured to send upstream transmission via one or more frequencies in a first frequency range and/or to receive downstream transmission via one or more frequencies in a second frequency range that is different from the first frequency range. The division between upstream and downstream transmission frequencies may sometimes be referred to as a "split." Upstream transmission may be via frequencies below frequencies used for downstream transmission. In one type of low-band split (also known as a low-split or a sub-split), a cross-over between upstream and downstream transmission may occur between 42 MHz and 108 MHz. For example, upstream transmission may be via frequencies between 5 MHz and 30 MHz and downstream transmission may be via frequencies above 108-1002 MHz. Alternatively, for example, upstream transmission may be via frequencies between 5 MHz to 40 MHz (or 42 MHz) and downstream transmission may be via frequencies above 52-54 MHz. In one type of mid-band split (also known as an extended sub-split), a cross-over between upstream and downstream transmissions may occur between 85 MHz and 108 MHz. For example, upstream transmission may be via frequencies between 5 MHz and 85 MHz and downstream transmission may be via frequencies above 108 MHz. In one type of high-band split, a cross-over between upstream and downstream transmission may occur between 204 MHz and 258 MHz. For example, upstream transmission may be via frequencies between 5 MHz and 204 MHz and downstream transmission may be via frequencies above 370 MHz. Bandwidth of a communication medium may be reallocated (e.g., a different split may be used).

Figure 3A:
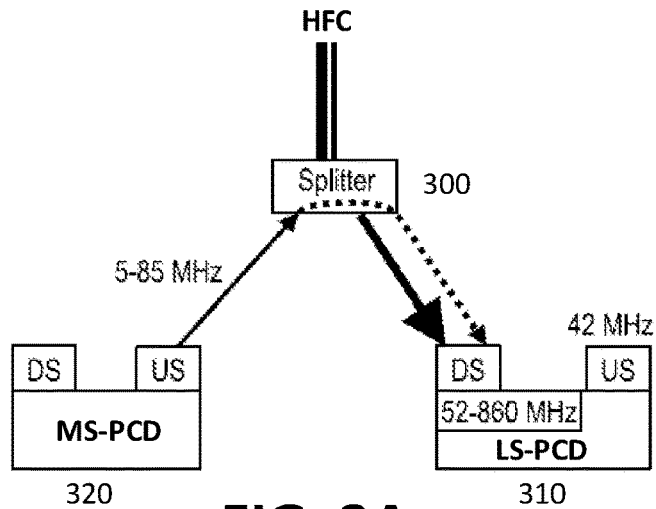
FIGS. 3A, 3B, and 3C show examples of coexisting premises computing devices with different band splits.
Figure 3B:
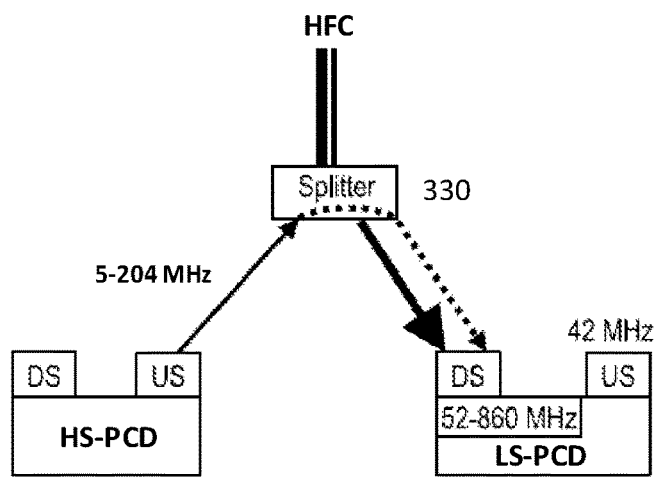
Figure 3C:
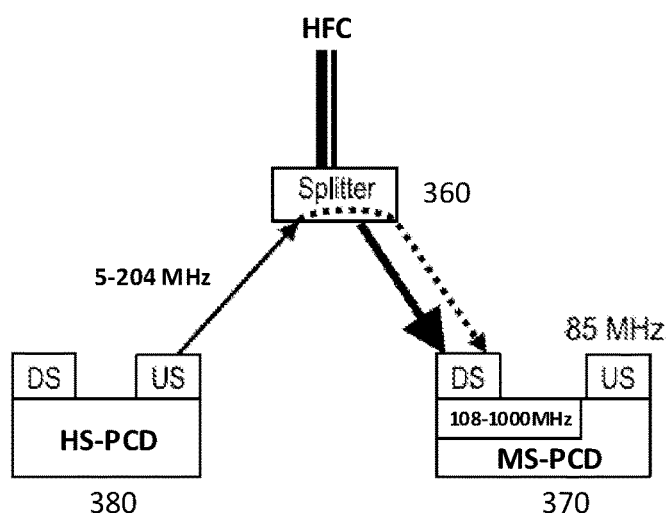

FIGS. 3A, 3B, and 3C show examples of coexisting premises computing devices with different band splits. FIG. 3A shows an example of a mid-band split premises computing device (MS-PCD) 320 coexisting in a premises with a low-band split premises computing device (LS-PCD) 310. The LS-PCD 310 may comprise, for example, a video STB, a pre-DOCSIS 3.0 cable modem (CM), or a DOCSIS 3.0

CM with a fixed standard-split diplex filter. The MS-PCD 320 may be designed with software-selectable diplex filters which may switch between the standard-split and mid-split modes. A premises computing device (PCD) may be connected to a cable feed off of a splitter 300 within the premises. The splitter, without sufficient port-to-port isolation, may allow the MS-PCD 320's upstream (US) transmission (e.g., 5-85 MHz) to interfere with the LS-PCD 310's downstream (DS) transmission (e.g., 52-860 MHz). The mid-band part (e.g., 42-85 MHz) of the upstream transmission from the MS-PCD 320 may leak/reflect through the splitter into the downstream receiver of the LS-PCD 310, unfiltered.

FIG. 3B shows an example of a high-band split premises computing device (HS-PCD) 350 coexisting in a premises with a low-band split premises computing device (LS-PCD) 340. A splitter 330 may allow the HS-PCD 350's upstream transmission (e.g., 5-204 MHz) to interfere with the LS-PCD 340's downstream transmission (e.g., 52-860 MHz). The mid-band part (e.g., 105-204 MHz) of the upstream transmission from the HS-PCD 350 may leak/reflect through the splitter 330 into the downstream receiver of the LS-PCD 340, unfiltered.

FIG. 3C shows an example of a high-band split premises computing device (HS-PCD) 380 coexisting in a premises with a mid-band split premises computing device (MS-PCD) 370. A splitter 360 may allow the HS-PCD 380's upstream transmission (e.g., 5-204 MHz) to interfere with the MS-PCD 370's downstream transmission (e.g., 108-1000 MHz). The mid-band part (e.g., 105-204 MHz) of the upstream transmission from the HS-PCD 380 may leak/reflect through the splitter 360 into the downstream receiver of the MS-PCD 370, unfiltered.

The leaked/reflected signals, in the coexisting PCDs of different band-splits of FIGS. 3A, 3B, and 3C, may cause interference affecting computing devices located in other premises (e.g., premises that may be neighboring, or otherwise nearby, a premises in which the coexisting PCDs are located) with video and broadband gateways that may be operate in a low-band split (5-42 MHz). Such interference may occur because there may not be enough isolation between the neighboring premises through existing splitters or taps. For example, energy from a high-band split node (e.g., a high-band split DOCSIS 3.1 modem) may swamp low noise amplifiers (LNAs) and programmable gain amplifiers (PGAs) in the front end of the gateways, and thus may cause interference affecting the gateways (e.g., automatic gain control of the gateways may be affected).

One approach to mitigate the above issue could be installing fixed notch filters at the neighboring premises to block this energy, for example, in the 85-258 MHz band, which may be received by gateways still operating in a low-band split. But installing a fixed notch filter at the neighboring premises may be not a procedure that is easily performed by many users. The solution may become prohibitively expensive if it has to be executed for every neighboring premises. In addition, over time, as the neighboring premises upgrade their service tiers that require the high-band split, removal of the previously installed filters may be appropriate. Further, it may be a challenging task, as time passes, to verify whether a filter has been installed or not at the neighboring premises. Such verification may involve dispatching a service vehicle or running targeted tests on the neighboring premises during a maintenance window to ascertain whether a premises computing device such as a modem in a home is able to detect signals, for example, in the 85-258 MHz band.

An alternate approach to mitigate this issue may be upgrading all the neighboring premises to newer broadband gateways that also operate in high-band split nodes and replacing video gateways with IP gateways. However, this approach may require that all legacy equipment at all the neighboring premises be upgraded or swapped at substantially the same time. Thus, both of the approaches described above may be prohibitively expensive and operationally challenging.

Figure 4:
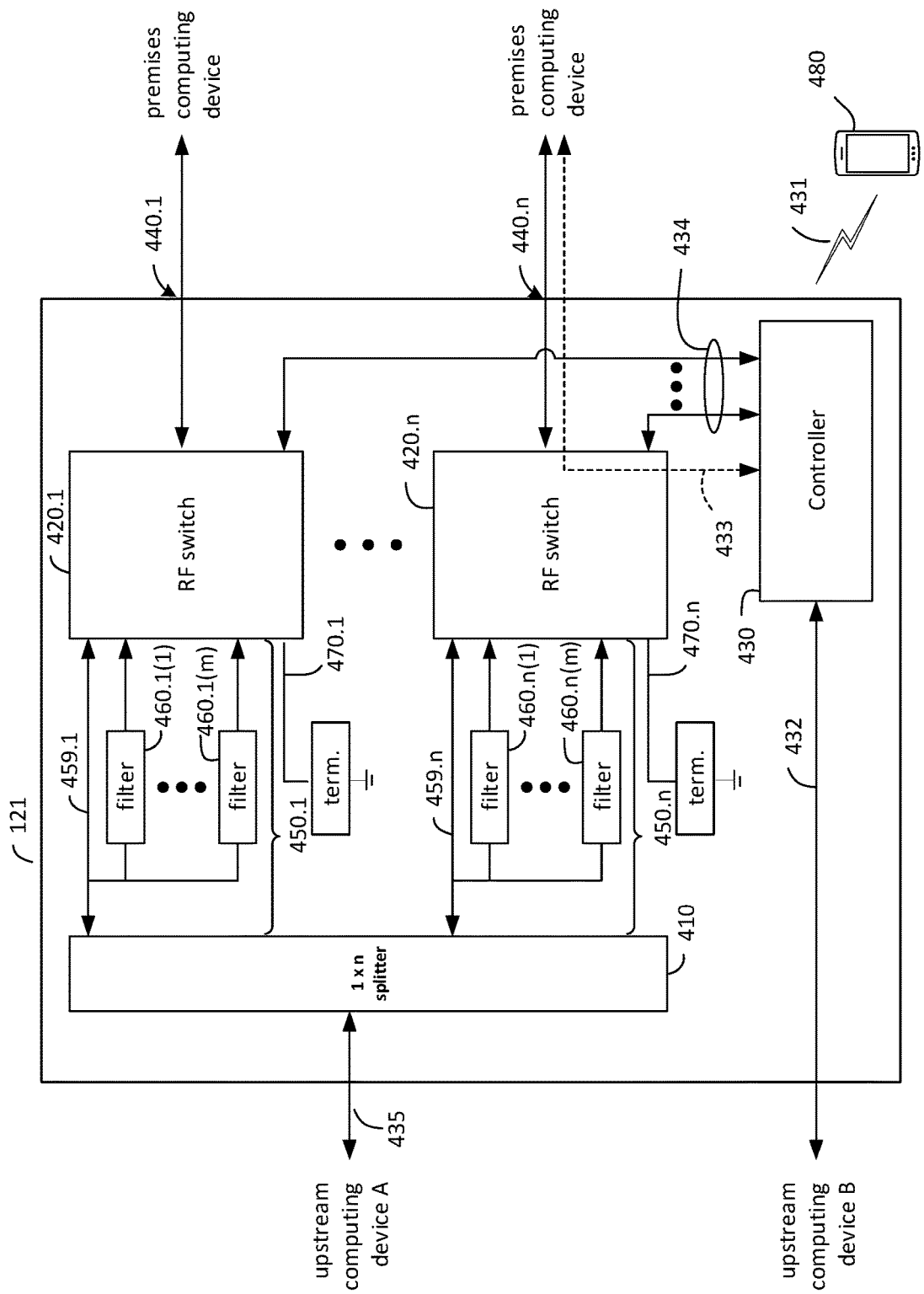
FIG. 4 shows an example of a network access device.

FIG. 4 shows an example of a network access device (NAD) 121. The NAD 121 (e.g., a line tap) may be installed between the distribution network facility 103 and the multiple premises 102 that are served by the distribution network facility 103. The NAD 121 may include an RF splitter 410, a plurality of RF switches 420.1 through 420.$n$ (collectively or generically, RF switch(es) 420), a controller 430, and a plurality of first ports 440.1 through 420.$n$ (collectively or generically, port(s) 440) that are coupled (e.g., via a communication medium) to premises computing devices in the multiple premises 102. For example, a port 440.1 may be connected to the gateway 111 in the premises 102$a$. The controller 430 may selectively control the RF switches 420 and consequently control a plurality of transmission or signal paths 450.1 through 450.$n$ (collectively or generically, signal path(s) 450) between the RF splitter 410 and the RF switches 420. Each of the transmission paths 450 may form, with a corresponding RF switch 420, a switchably-filtered signal path that connects (via the RF splitter 410) a corresponding one of the first ports 440 with a second port 435 (e.g., an upstream-side port). The second port 435 may be connected to a cable connecting the NAD 121 to an upstream computing device A (e.g., the interface 104). Each of the transmission paths 450 may comprise a plurality of alternate paths, between the RF splitter 410 and a corresponding RF switch 420, to which that RF switch 420 may connect. Each of the transmission paths 450 may comprise a corresponding one of direct (e.g., unfiltered) connections 459.1 through 459.$n$ (collectively or generically, direct connection(s) 459). Each of the transmission paths 450 may further comprise a plurality of notch filters 460.1(1) through 406.1($m$) (collectively or generically, notch filter(s) 460). The notch filters 460 may be bi-directional in that signals entering from either ends of the notch filters 460 may be filtered in the same fashion. Each notch filter 460 of a signal path 450 may have its own range of frequencies, different from other notch filters of that signal path 450, for filtering. A notch filter 460 may pass signals with frequencies below a "notch" range of frequencies and above the notch range of frequencies while suppressing signals with frequencies within the notch range of frequencies. An RF switch 420 may switch to multiple notch filters 460 simultaneously so as to, for example, combine those filters and effectively form a notch filter with an expanded notch range. A plurality of ground terminals 470.1 through 470.$n$ (collectively or generically, ground terminal(s) 470) may be used to ground (e.g., interrupt) one or more transmission paths 450.

An RF switch 420, as controlled by the controller 430, may be switched to connect a corresponding port 440 to any of: a corresponding ground terminal 470, one or more of the corresponding notch filters 460, and/or a corresponding direct connection 459 (e.g., the RF switch 420.1 may connect the port 440.1 to any of the ground terminal 470.1, one or more of the notch filters 460.1, and/or the direct connection 459.1). Connecting a ground terminal 470 to a corresponding port 440 may short and interrupt the corresponding transmission path 450 and disable that corresponding port 440. For example, the ground terminal 470 may be terminated through a resistor (e.g., 75 ohm resistor) to the ground to reduce signal reflections. Disconnecting an RF switch 420 from its corresponding ground terminal 470 and connecting to a portion of a corresponding transmission path 450 (e.g., the corresponding direct connection 459 and/or one or more of the corresponding notch filters 460) may enable that corresponding transmission path 450.

An RF switch 420 may be switched to connect a port 440 (e.g., port 440.1) to one or more filters 460 (e.g., filter 460.1(1)) so that signals over a transmission path 450 (e.g., transmission path 450.1) are filtered by the one or more filters 460. Likewise, the RF switch 420 may be switched to disconnect the port 440 from the one or more filters 460, and connect that port 440 to the splitter 410 via a direct connection 459, so that the signals over the transmission path 450 are unfiltered. An RF switch 420 may make any connection (e.g., to a corresponding direct connection 459, to one or more corresponding notch filters 460, and/or to a corresponding ground terminal 470) as part of an initial setup or after (or in conjunction with) any disconnection (e.g., disconnecting from a corresponding ground terminal 470, from one or more corresponding notch filters, and/or from a corresponding direct connection 459).

The RF splitter 410 may split downstream signals from an upstream computing device A into the transmission paths 450, which extend, via corresponding RF switches 420, to the corresponding ports 440. The RF splitter 410 may merge upstream signals from the ports 440, received via the transmission paths 450, and transmit via the second port 435 to the upstream computing device A.

The controller 430 may communicate, via an upstream-side control interface 432, with an upstream computing device B. The upstream-side control interface 432 may be via a separate out-of-band signal path or via the same medium over which other upstream and downstream communications are sent to/received from the distribution network facility 103 via the second port 435. The upstream computing device B may be a distribution network device (e.g., the NAD control server 122 located at the distribution network facility 103), the upstream computing device A, or different computing device. The controller 430 may communicate, via a local control interface 434, with the RF switches 420. The controller 430 may communicate, via a premises control interface 433, with a premises computing device. The premises control interface 433 may be via the RF switches 420 and the ports 440. The controller 430 may also wirelessly communicate, via a wireless interface 431, with a wireless computing device 480 (e.g., smart phone, tablet, IoT device, etc.). The wireless interface 431 may, for example, comprise a WiFi interface, a ZigBee interface, a BTLEE interface, a BLUETOOTH interface, and/or some other type of wireless interface. A network operator may send one or more messages, via the upstream-side control interface 432, to the controller 430 of the NAD 121. The network operator may send one or more messages, via the upstream-side control interface 432, for example, to instruct the controller 430 in real-time to switch on or off one or more filters 460 of one or more signal paths 450 associated with one or more of the ports 440 of the NAD 121. Further, the network operator may send one or more messages, via the upstream-side control interface 432, for example, to query the controller 430 of the NAD 121 in real-time to obtain current statuses of one or more filters 460 (e.g., whether a filter 460 is switched into a signal path 450). The controller 430 may store (e.g., in a memory) data indicating the status of each RF switch 420 (e.g., whether the RF switch 420 is connected to its corresponding direct connection 459, to one or more of its corresponding notch filters 460, and/or to its corresponding ground terminal 470), data indicating associations between the RF switches 420 and the ports 440, data associated with premises 102 to which each the ports 440 are connected, data regarding one or more premises devices at each of those premises, and/or other data.

A technician on site may use an application on the technicians' wireless computing device 480 to wirelessly communicate, via the wireless control interface 431, with the controller 430 of the NAD 121. The technician may wirelessly communicate, via the wireless control interface 431, with the controller 430, and be able to perform similar operations as the network operator. The technician, for example, using a tablet or a smart phone, may be able to perform any maintenance, diagnostic, troubleshooting operations without physically accessing the NAD 121.

Figure 5:
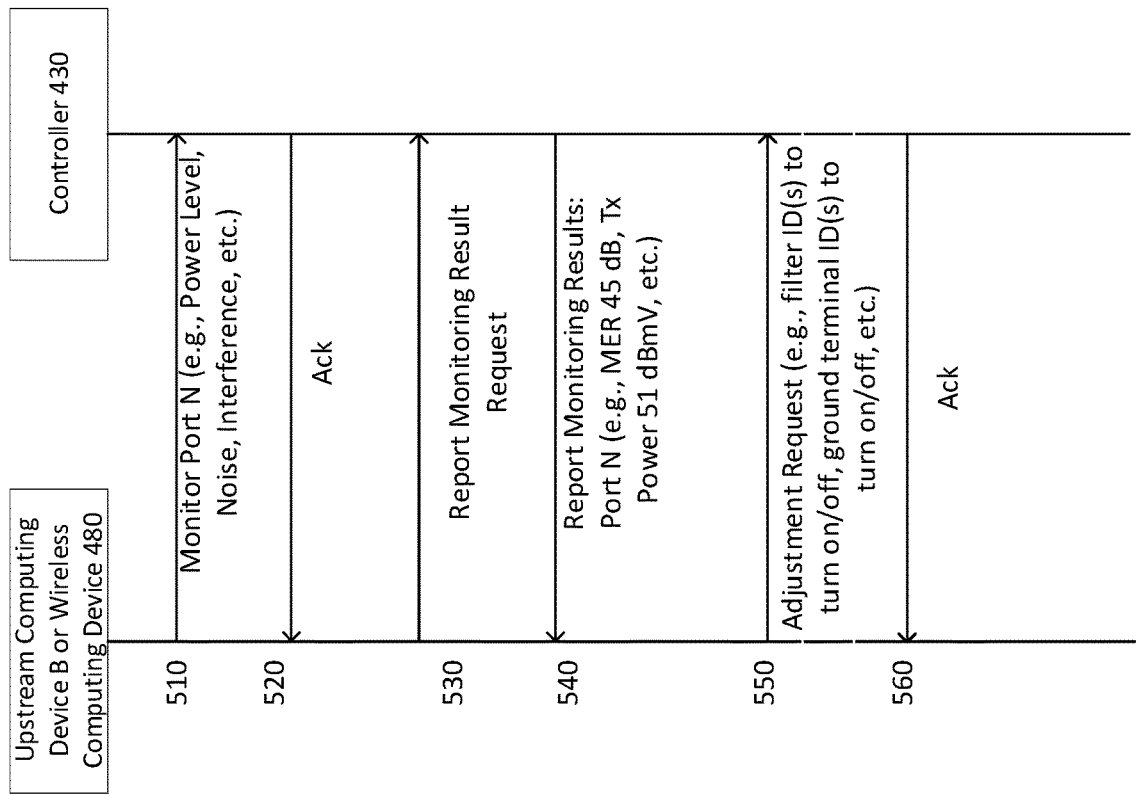
FIG. 5 shows an example of messaging between an upstream computing device or a wireless computing device and a controller of the network access device.

FIG. 5 shows an example of messaging between the upstream computing device B or the wireless computing device 480 and the controller 430 of the network access device 121. Communications between the upstream computing device B and the controller 430 may be via the upstream-side control interface 432. Communications between the wireless computing device 480 and the controller 430 may be via the wireless interface 431. For example, the upstream computing device B may send, via the upstream-side control interface 432, the controller 430 a request message 510 indicating and/or instructing that the controller 430 is to monitor one or more ports 440 of the NAD 121. The request message 510 may comprise or otherwise indicate a number of parameters (e.g., a power level of signal, a noise level of signal, dropped packets, timeouts, etc.) to be monitored for the one or more ports. Also or alternatively, the request message 510 may indicate and/or instruct that the controller 430 is to receive monitoring results (e.g., RX power at premises computing device, TX power at premises computing device, etc.) from a premises computing device. The controller 430 may send back an acknowledgement message (Ack) 520, for example, to acknowledge the receipt of the request message, and start monitoring the one or more ports 440 of the NAD 121. After a duration of time, the upstream computing device B may send another request message 530 to the controller 430 requesting reporting of the monitoring result(s). Also or alternatively, the controller 430 may periodically report the monitoring result(s), for example, based on a duration of time specified by the request message 510 and/or by the request message 530, and/or based on a duration of time preset by the controller 430 (e.g., during setup of the NAD 121).

The controller 430 may send a report message 540 to the upstream computing device (or a wireless computing device) for reporting monitoring results. The message 540 may be sent in response to the report monitoring result request 530 or periodically, as indicated above. The report message 540 may comprise values for monitored parameters such as MER (e.g., MER 45 dB), a transmission power level (e.g., Tx Power 51 dBmV), etc. The upstream computing device B may, based on the report monitoring results 540, send an adjustment request message 550 to the controller 430. The adjustment request 550 may be used to provide instructions to the controller 430 to reconfigure one or more of the transmission paths 450 of the NAD 121 (e.g., for addressing any issues determined based on the monitoring). For example, the adjustment request 550 may include indicators of one or more filters 460 to be added or removed from a transmission path 450, of one or more ground terminal connections 470 to be opened or closed, etc. The controller 430 may send an acknowledgement message (e.g., Ack 560) to the upstream computing device, for example, after making the requested adjustment in response to the adjustment request 550. A technician on site may use the technician's wireless computing device 480 and wirelessly interact with the controller 430 to perform the similar operations as the upstream computing device B or override the switch setting of one or more ports 440.

Figure 6:
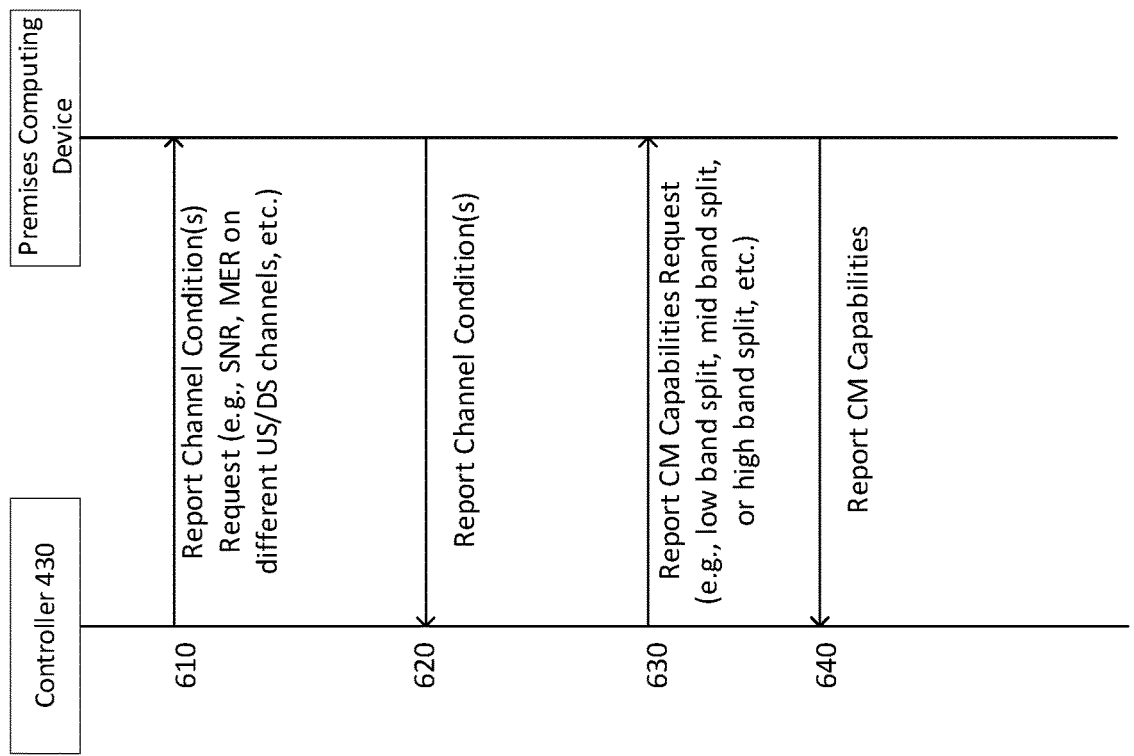
FIG. 6 shows an example of messaging between the controller of the network access device and a premises computing device.

FIG. 6 shows an example of messaging between the controller 430 of the network access device 121 and a premises computing device. Communications between the controller 430 and the premises computing device may be via the premises control interface 433. For example, the controller 430 may send a report channel condition(s) request 610 via the premises control interface 433 to a premises computing device (e.g., a broadband gateway) at a premises 102. The report channel condition(s) request 610 may include parameters (e.g., SNR, MER on different upstream/downstream channels of one or more ports, etc.) to measure channel conditions. The premises computing device may send a report channel condition(s) message 620 to the controller 430 in response to the report channel condition(s) request 610. The report channel condition(s) message 620 may return the result of the measurement based on the parameters. The controller 430 may also send report CM capabilities request 630 to the premises computing device. The report CM capabilities request 630 may include one or more ports' identifications. The premises computing device may send report CM capabilities 640 to the controller 430. The report CM capabilities 640 may indicate band split configurations of the one or more ports 440 (e.g., ports 1-4 configured with the low-band split, ports 5-10 configured with the mid-band split, ports 11-15 configured with the high-band split, etc.).

Figure 7:
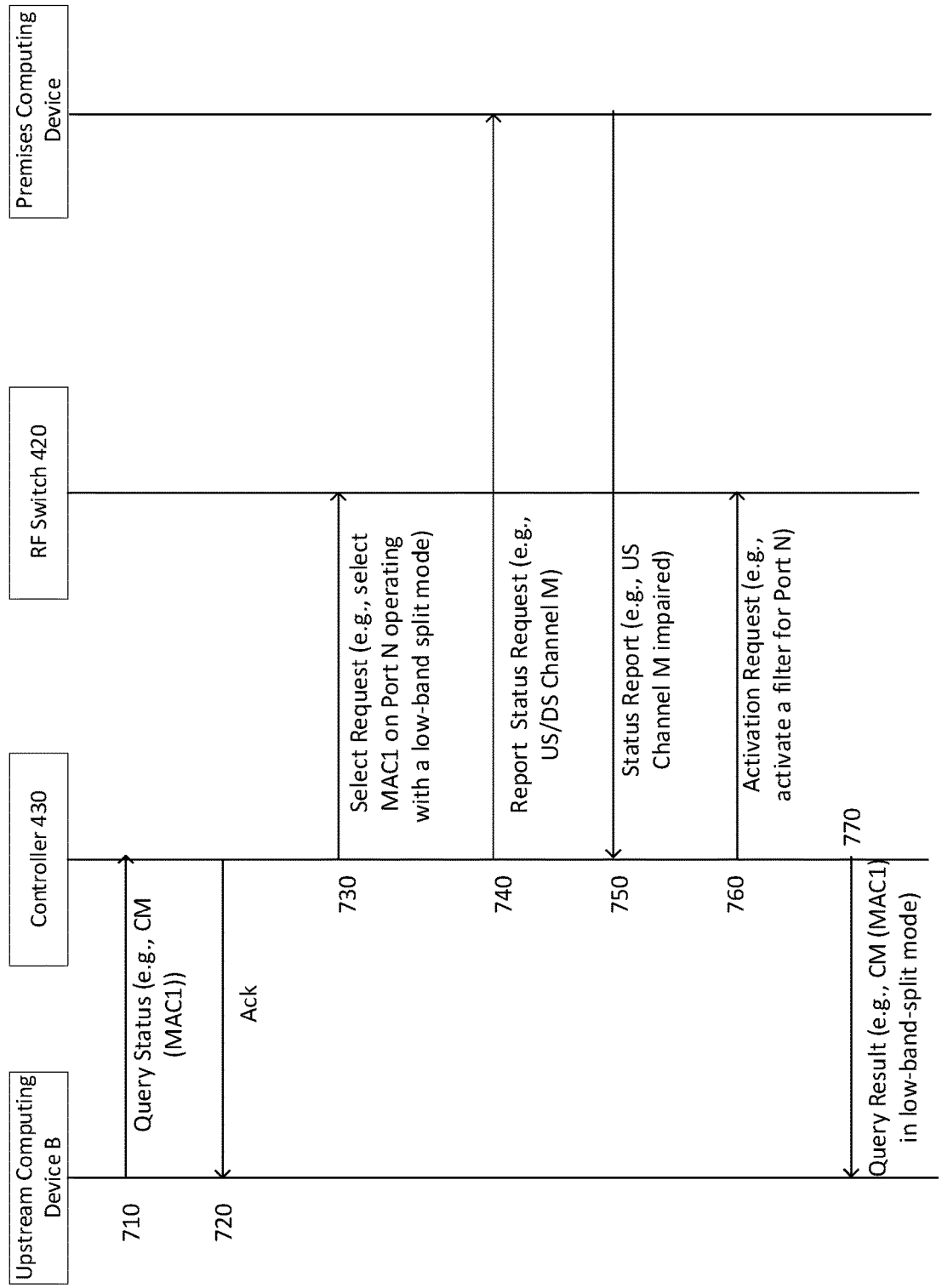
FIG. 7 shows an example of messaging between an upstream computing device, a controller, a switch, and a premises computing device.

FIG. 7 shows an example of messaging between the upstream computing device B, the controller 430 of the NAD 121, the RF switch 420.1, and a premises computing device. For convenience, FIG. 7 is described using an example of communications with (or associated with) a premises computing device associated with port 440.1, but similar operations and communication may be performed and/or sent/received with regard to any port 440. Operations of FIG. 7 performed by the upstream computing device B, and/or communications sent/received by the upstream computing device B, may also or alternatively performed and/or sent/received by the wireless computing device 480. The upstream computing device B may cause the controller 430 to query a CM associated with a premises computing device associated with the port 440.1, detect a signal interference on the CM, and further address the signal interference. For example, the upstream computing device B may send a query status message 710 to the controller 430. The query status message 710 may identify a cable modem (CM) by its media access control address (MAC) (e.g., CM MAC1). The controller 430 may send an acknowledgement 720 to the upstream computing device B for acknowledging the receipt of the query status message 710. For another example, the upstream computing device B may send a request to the controller 430 to measure a noise during a quiet time period (e.g., a period of time when modem(s) connected to a port 440.n is not transmitting to get a baseline of RF conditions (e.g., SNR) on port 440.n). Alternatively, the upstream computing device B may send a request to the controller 430 to collect statistical measurement over a period of time. Further, the controller 430 may send a select request 730 to the RF switch 420.1, for example, to select MAC1 on the port 440.1. The controller 430 may subsequently send a report status request 740 to the premises computing device, for example, for the status of upstream/downstream channel-M. The premises computing device may send a status report 750, for example, indicating upstream channel-M being impaired (e.g., signal interference), to the controller 430. The controller 430 may send an activation request 760 to the RF switch 420.1, for example, to switch one or more of the filters 460.1-460.m into the transmission path 450.1. The switched filter(s) 460 may block signals within a range of frequencies (e.g., 42-258 MHz) based on a bandwidth allocated for the upstream channel-M (e.g., the low-band split 5-42 MHz). The controller 430 may send a query result 770 to the upstream computing device B. For example, the query result 770 may indicate CM MAC1 being operational in the low-band split.

Figure 8:
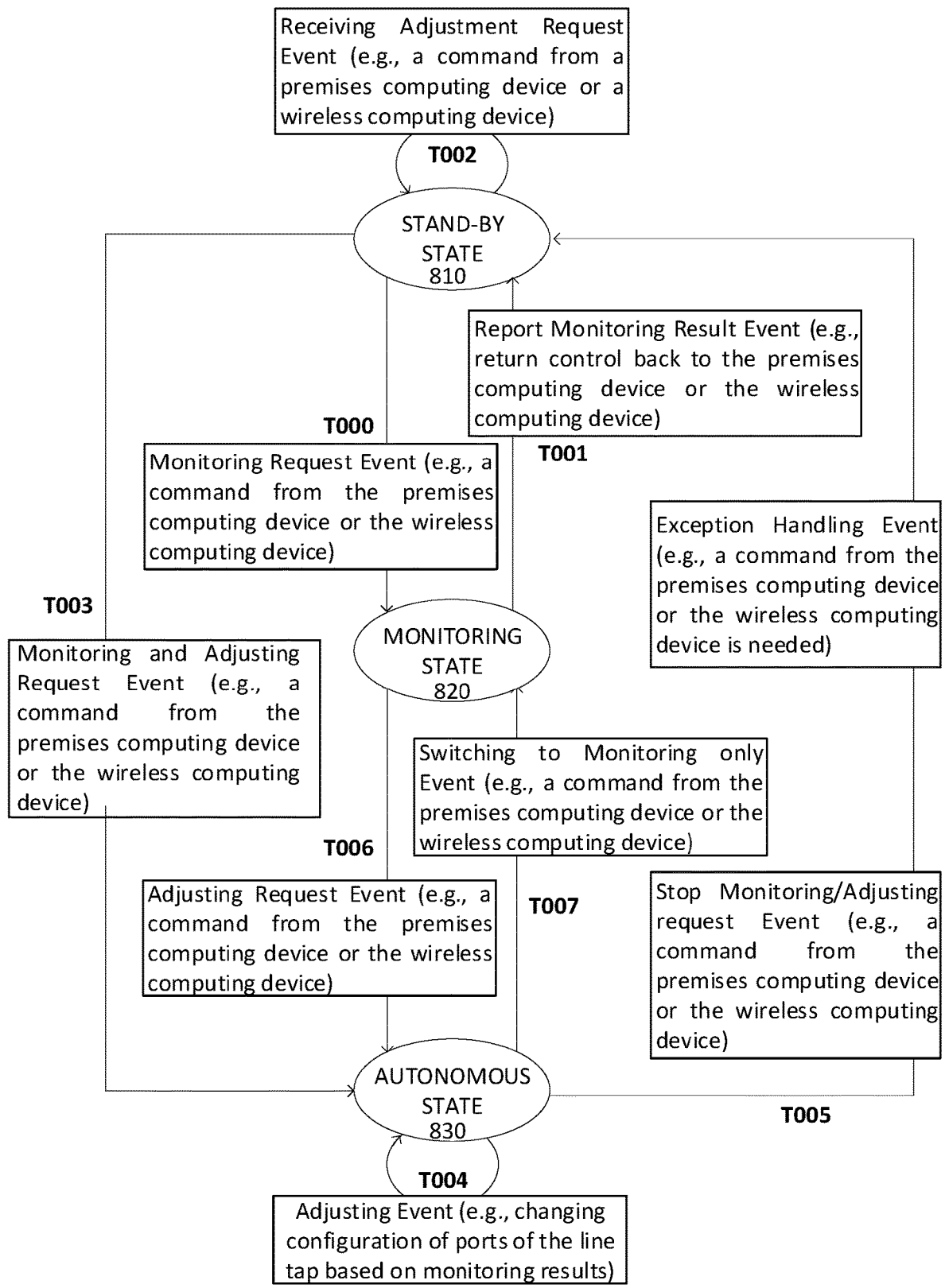
FIG. 8 shows an example of a finite state machine for a controller.

FIG. 8 shows an example of a finite state machine for the controller 430. The controller 430 may be in stand-by state 810, monitoring state 820, or autonomous state 830. The controller 430 may make transition T000 from the stand-by state 810 to the monitoring state 820 based on a message received, for example, from the upstream computing device B and/or the wireless computing device 480. The message may be a command signal requesting a monitoring (e.g., the request message 510, the query status message 710). In the monitoring state 820, the controller 430 may continue monitoring statuses of one or more ports 440, for example, for a period of time or until receiving another message from the upstream computing device B and/or wireless computing device 480 (e.g., the request message 530) requesting results of the monitoring. The controller 430 may make transition T001 from the monitoring state 820 back to the stand-by state 810, for example, based on the other command signal or expiration of the period of time. Also or alternatively, the controller 430 may make transition T006 from the monitoring state 820 to the autonomous state 830 based on a message from the upstream computing device B and/or wireless computing device 480. The message may instruct the controller 430 to operate autonomously, for example, adjusting switch settings of the NAD 121 based on the results of the monitoring.

The controller, in the stand-by state 810 at transition T002, may receive an adjustment request, for example, a command signal from the upstream computing device B and/or the wireless computing device 480 (e.g., the adjustment request 550), to reconfigure switch settings of one or more of the RF switches 420 in the NAD 121. The controller 430 may generate one or more control signals, for example, based on the command signal, for reconfiguring the switch settings. The controller 430 may make transition T003 from the stand-by state 810 to the autonomous state 830 based on a message received, for example, from the upstream computing device B and/or the wireless computing device 480. The message may be a command requesting the controller 430 to operate autonomously, for example, for a time period or indefinitely until further instruction from the upstream computing device B and/or wireless computing device 480. For example, the command may instruct the controller 430 to operate autonomously for the time period and make transition T005 to the stand-by state 810 or transition T007 to the monitoring state 820. The controller 430 in the autonomous state 830 may continue monitoring statuses of one or more ports 440 and/or receive monitoring results from premises computing devices. Further, the controller 430, in the autonomous state 830 at transition T004, may adjust, for example, switch settings of one or more of the RF switches 420 in the NAD 121 based on results of the monitoring without intervention from the upstream computing device B and/or the wireless computing device 480. For example, the controller 430, in the autonomous state 830, may monitor or capture a spectrum of Long-term evolution (LTE) frequency bands and determine that a port 440 has LTE leakage. The controller 430 at transition T004 may set an RF switch 420 to disable that port 440 to block out the spectrum of the LTE frequency bands (e.g., 700 MHz). For example, the controller 430, in the autonomous state 830, may also monitor or capture a spectrum of MoCA frequencies and determine that one or more of the ports may not have MoCA Point of Entry (POE) filters and premises computing devices on those one or more ports (e.g., premises computing devices in two premises) may be forming a MoCA link. The controller 430 at transition T004 may set an RF switch 420 to filter the MoCA frequencies thereby breaking the MoCA link between the two premises. The controller 430 may make transition from the autonomous state 830 to the monitoring state 820 or the stand-by state 810. For example, the controller 430 may make transition T005 from the autonomous state 830 to the stand-by state 810, for example, based on a message (e.g., a command to stop autonomous mode of operation and stand-by) received from the upstream computing device B and/or the wireless computing device 480, an expiration of the time period, or exception handling (e.g., exceptional issues requiring interventions from the upstream computing device B and/or the wireless computing device 480). The exception handling may involve, for example, a number of ports 440 being disabled due to impairments that may be serviced/repaired by the upstream computing device B and/or a technician on site. The controller 430 may make transition T007 from the autonomous state 830 to the monitoring state 820, for example, based on a message (e.g., a command instructing the controller to perform monitoring only) from the upstream computing device B and/or the wireless computing device 480 and/or an expiration of the time period.

The upstream computing device B and/or the wireless computing device 480 may send a step-back message to the controller 430, for example, in the stand-by state 810 or the monitoring state 820. The step-back message may request the controller 430 to go back to the last switch settings of the RF switches 420 in the NAD 121. For this purpose, the controller 430 may store at least the last switch settings and be able to go back to the last switch settings upon such request. The step-back message may serve the network operator or the technician on site for performing troubleshooting or diagnostics. For example, if operations of the ports 440 of the NAD 121 degrade or may not improve after new switch settings, the network operator or the technician on site may able to go back at least to the previous switch settings of the RF switches 420 in the NAD 121 and try again with different switch settings. For example, the step-back message may also cause the controller 430 to make transition to the stand-by state 810.

The upstream computing device B and/or the wireless computing device 480 may send a reset message to the controller 430, for example, in any one of the three states. The reset message may cause the controller 430 to reset the switch settings of the RF switches 420 in the NAD 121 to default switch settings. In the default switch settings, signals may passively pass through the ports 440 of the NAD 121 without being filtered, grounded, terminated, or altered. For example, the reset message may also cause the controller 430 to make transition from any of the three states to the stand-by state 810 for fresh start or re-start.

Figure 9A:
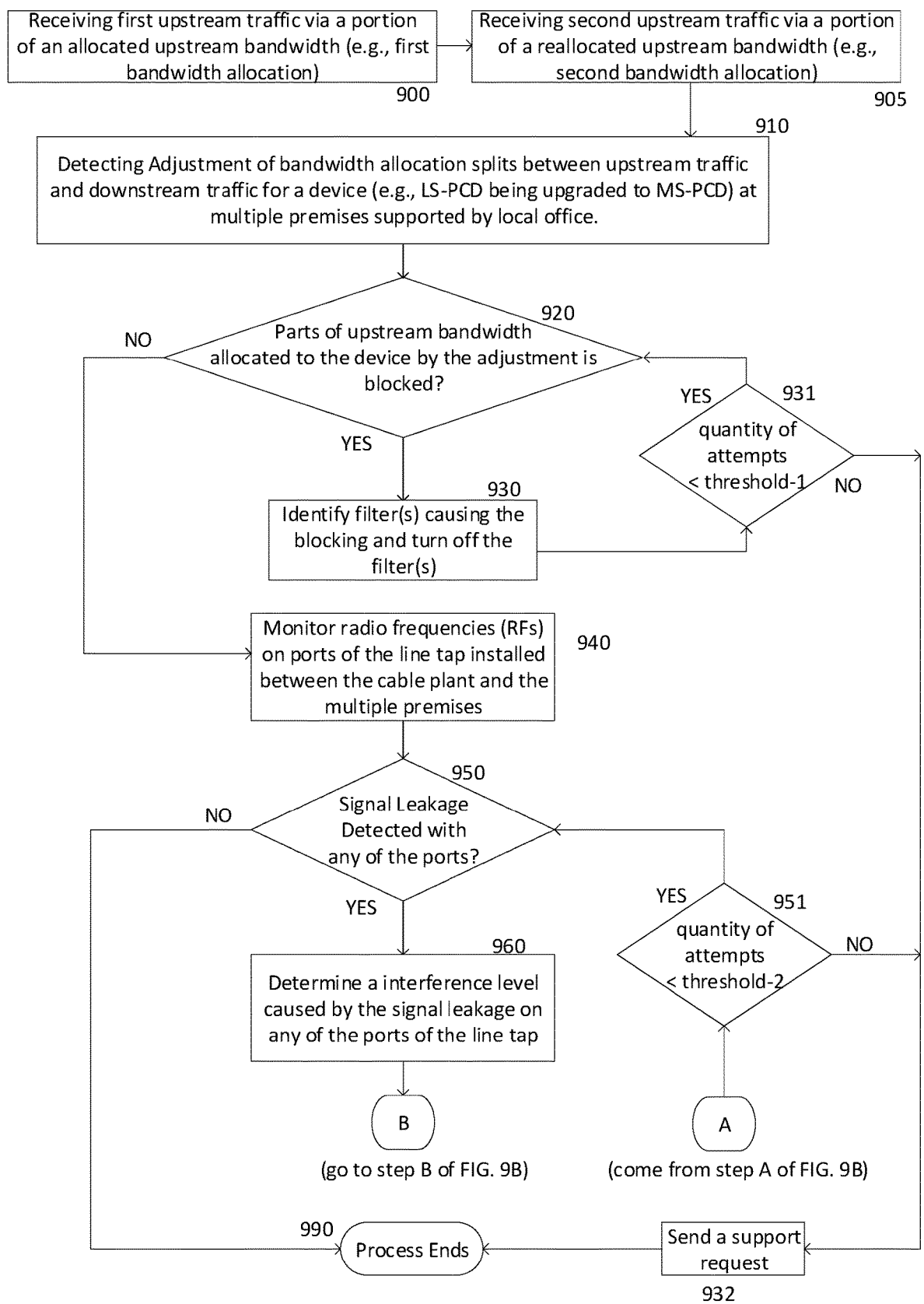
FIGS. 9A and 9B show an example of a flow chart showing steps of an example method associated with a network access device.
Figure 9B:
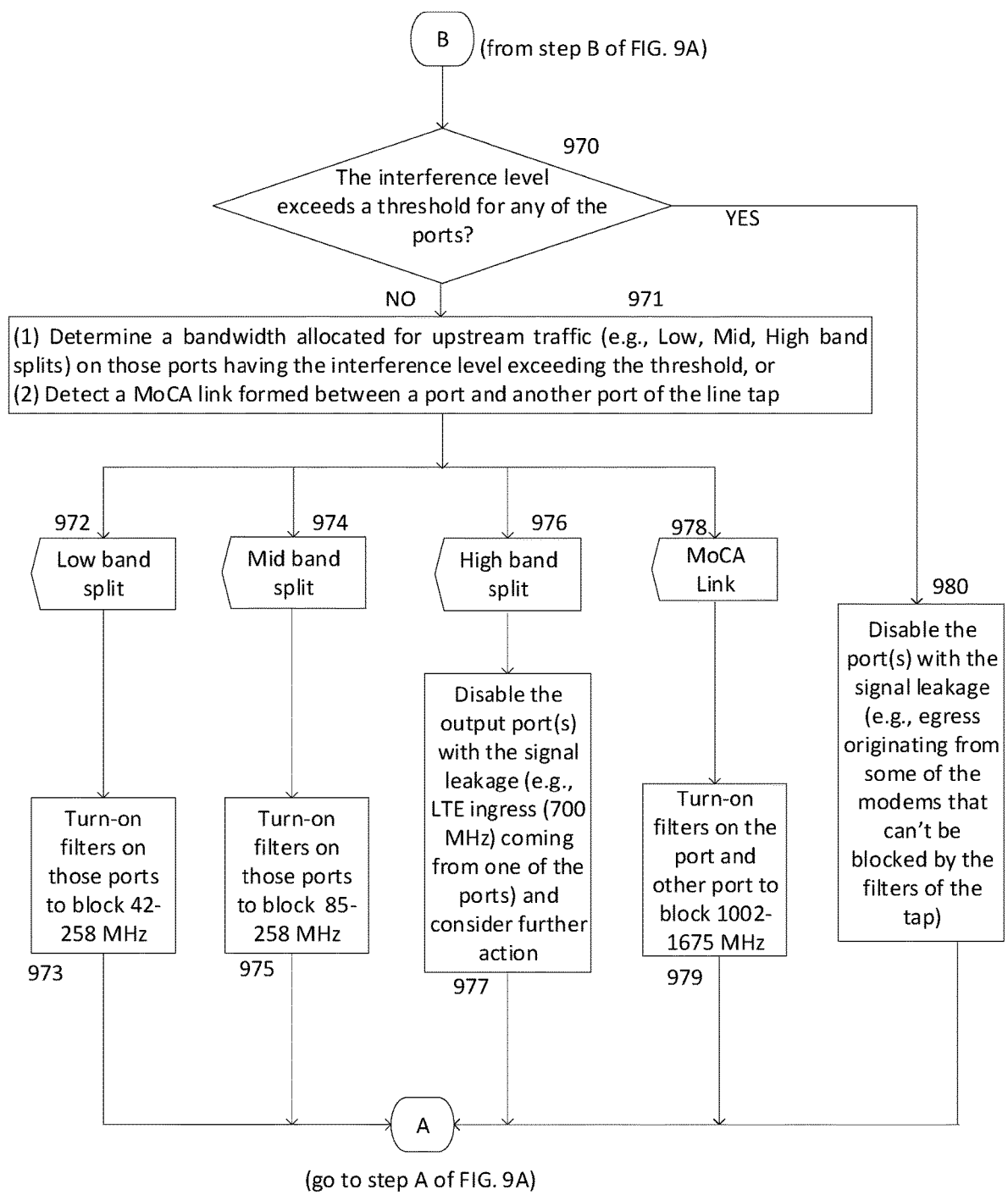

FIGS. 9A and 9B show an example of a flow chart showing steps of an example method associated with a network access device (e.g., NAD 121). For convenience, FIGS. 9A and 9B are described by way of an example in which the steps are performed by the controller 430 of the NAD 121. One, some, or all steps of the example method of FIGS. 9A and 9B, or portions thereof, may be performed by one or more other computing devices (e.g., upstream computing device B, the wireless computing device 480, a premises computing device, etc.). One, some, or all steps of the example method of FIGS. 9A and 9B may be omitted, performed in other orders, and/or otherwise modified, and/or one or more additional steps may be added.

At step 900, the NAD 121 may receive, via a communication medium connected to the ports 440, and from one or more devices at one or more premises (e.g., the premises 102*a*), one or more first upstream signals. The one or more first upstream signals may be received via at least a portion of an allocated upstream bandwidth of the communication medium.

After step 900, and prior to step 905, there may be a reallocation of bandwidth of the communication medium. For example, the allocated upstream bandwidth in step 900 may correspond to a first bandwidth allocation. In the first bandwidth allocation, a first portion of the communication medium bandwidth (the allocated upstream bandwidth) may be allocated to upstream communications. A second portion of the communication medium bandwidth (the allocated downstream bandwidth) may be allocated to downstream communications. The second portion may, for example, comprise a portion of the communication medium bandwidth that remains after exclusion of the allocated upstream bandwidth, or after exclusion of the allocated upstream bandwidth and of a first guard band between the allocated upstream bandwidth and the allocated downstream bandwidth.

After the reallocation of the communication medium bandwidth, upstream and downstream bandwidth may be reallocated according to a second bandwidth allocation. In the second bandwidth allocation, a third portion of the communication medium bandwidth (the reallocated upstream bandwidth) may be allocated to upstream communications and a fourth portion of the communication medium bandwidth (the reallocated downstream bandwidth) may be allocated to downstream communications. The fourth portion may, for example, comprise a portion of the communication medium bandwidth that remains after exclusion of the reallocated upstream bandwidth, or after exclusion of the reallocated upstream bandwidth and of a second guard band between the reallocated upstream bandwidth and the reallocated downstream bandwidth. The reallocated upstream bandwidth may be larger than the allocated upstream bandwidth. For example, the reallocated upstream bandwidth may comprise the first part of the communication medium bandwidth (the allocated upstream bandwidth), as well as a portion of the first guard band (between the allocated upstream bandwidth and the allocated downstream bandwidth) and/or a portion of the second part of the communication medium bandwidth (the allocated downstream bandwidth).

At step 905, the NAD 121 may receive, via the communication medium connected to the ports 440, and from one or more devices at one or more premises, one or more second upstream signals. The one or more second upstream signals may be received via at least a portion of the reallocated upstream bandwidth that was, prior to the reallocation, part of the allocated downstream bandwidth and/or part of the first guard band between the allocated upstream bandwidth and the allocated downstream bandwidth.

At step 910, for example, the NAD 121 may detect that the network operator or the technician on site upgraded a legacy computing device at the premises 102a. For example, the upgraded computing device may be a mid-band split or high-band split premises computing device, as shown in FIGS. 3A, 3B, and 3C. The upgraded computing device may cause one or more of the problems described in FIGS. 3A, 3B, and 3C. At step 920, the controller 430 may determine whether parts of upstream bandwidth allocated to a device (e.g., upgraded premises computing device) are blocked. For example, the blocking may be caused by a filter that was previously switched on for the legacy computing device that has been replaced by the upgraded computing device. In other words, the upgraded computing device may not be able to detect a full spectrum of the upstream bandwidth allocated due to the filter that was turned on to prevent signal interference for the legacy computing device. The controller 430 may determine that the parts of upstream bandwidth allocated to the upgraded computing device are blocked and perform step 930. At step 930, the controller 430 may identify the filter causing the blocking, switch off the filter, and perform step 931. At step 931, the controller 430 may determine whether a number of attempts to remove the blocking is less than a threshold quantity (e.g., a threshold-1). The controller 430 may determine that the quantity of attempts is less than the threshold-1, and perform step 920 for re-evaluation. Alternatively, the controller 430 may determine that the quantity of attempts is not less than the threshold-1, and perform step 932. At step 932, the controller 430 may send a support request, for example, to the upstream computing device B and/or the wireless computing device 480, and perform step 990 to end the process. At step 920, the controller 430 may determine that the parts of upstream bandwidth allocated to the upgraded computing device may not be blocked and perform step 940.

At step 940, the controller 430 may monitor one or more of the ports 440 of the NAD 121. At step 950, the controller 430 may determine whether signal leakage from one or more of the ports 440 is detected. The controller 430 may comprise a spectrum analyzer with a wide range of spectrum (e.g., 5-1794 MHz). The spectrum analyzer may be used to detect signal anomalies, for example, signal leakage from one or more of the ports 440. The controller 430 may determine that no signal leakage is detected and perform step 990 to end the process. The controller 430 may determine that signal leakage is detected and perform step 960. At step 960, the controller 430 may determine an interference level caused by the signal leakage on any of the ports 440 of the NAD 121 and perform step 951, as described in FIG. 9B. At step 951, the controller 430 may determine whether a quantity of attempts to address a signal leakage problem has exceeded a threshold quantity of times (e.g., threshold-2). The controller 430 may determine that the quantity of attempts has exceeded the threshold-2, and perform step 932 to send a support request, for example, to the upstream computing device B and/or the wireless computing device 480. For example, the network operator or the technician on site may address the signal leakage problem in response to the support request. The controller 430 may determine that the quantity of attempts has not exceeded the threshold-2, and perform step 950 for re-evaluation. At step 950, the controller may determine that signal leakage is not detected (e.g., step 960 yielded successful remedy) and perform step 990 to end the process.

In FIG. 9B, at step 970, the controller 430 may determine a level of impact (e.g., a level of signal interference), caused by the signal leakage, on devices coupled to one or more of the ports 440. At step 970, the controller 430 may compare the level of signal interference with a threshold, and may perform step 980 based on the result of the comparison (the level of signal interference exceeds the threshold). For example, the controller 430 may measure a parameter value indicative of the level of signal interference, (e.g., signal-to-noise ratio (SNR), modulation error rate (MER), bit error rate (BER), etc.), and compare the measured parameter value against a respective threshold. The threshold may be a maximum level of signal interference that may be manageable by filtering. As such, beyond the threshold, the signal interference may not be manageable by filtering, and the ports 440 impacted by the leaked signal, for example, may be disabled. At step 980, the controller 430 may disable the ports 440 impacted by the leaked signal and perform step 951, as described in FIG. 9A.

At step 970, the controller 430 may determine that the level of signal interference is below the threshold, and perform step 971. At step 971, the controller 430 may identify a bandwidth allocated for upstream transmission (e.g., the low-band split (case 972), the mid-band split (case 974), or high-band split (case 976)) for the ports 440 impacted by the leaked signal. The controller 430 may also detect a spectrum of MoCA frequencies, determine that one or more ports 440 may not have MoCA POE filters, and further may determine that devices coupled with one or more ports 440 (e.g., premises computing devices in two premises) may be forming a MoCA link (case 978). The controller 430 may perform steps 973, 975, 977, and/or 979 based on different determinations made at step 971.

For example, the controller 430 may determine that the bandwidth allocated for upstream transmission on the port 440 impacted may be 5-42 MHz (case 972 of the low-band split) (e.g., a device associated with a premises connected to the port 440 may have the low-band split configuration) and at step 973, may switch a first filter 460 into the signal path 450 associated with that port 440 to block a first range of frequencies (e.g., 42-258 MHz) accordingly. The controller 430 may determine that the bandwidth allocated for upstream transmission on the port 440 impacted may be 5-85 MHz (case 974 of the mid-band split) and at step 975, may switch a second filter 460 into the signal path 450 associated with that port 440 to block a second range of frequencies (e.g., 85-258 MHz) accordingly. The controller 430 may determine that the bandwidth allocated for upstream transmission on the port 440 impacted may be 5-204 MHz (case 976 of the high-band split) and thus that computing device(s) at a premises may be configured with a high-band split. In case 976, the port 440 may be impacted by LTE leakage. At step 977, the controller 430 may disable the port 440 (e.g., switch the port 440 to a ground terminal 470). Further, the controller 430 may determine that premises computing devices in the two premises may be forming a MoCA link (case 978 of MoCA link), and at step 979, may switch third filters 460 into the signal paths 450 associated with those ports 440 to block a third range of frequencies (e.g., 1002-1657 MHz) accordingly. At the end, the signal leakage processing goes back to step 951, as described in FIG. 9A.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a network access device and via at least a portion of an allocated upstream bandwidth of a communication medium, one or more first upstream signals;
receiving, by the network access device and via a portion of a reallocated upstream bandwidth of the communication medium, one or more second upstream signals, wherein the portion of the reallocated upstream bandwidth is not part of the allocated upstream bandwidth;
determining, based on interference from reflection of at least a portion of the one or more second upstream signals, one or more modifications to one or more signal paths, of a plurality of switchably-filtered signal paths of the network access device, associated with one or more devices affected by the interference; and
causing, by the network access device, the determined one or more modifications to the one or more signal paths.

2. The method of claim 1, wherein:
the reallocated upstream bandwidth is larger than the allocated upstream bandwidth;
the allocated upstream bandwidth corresponds to a first bandwidth allocation of the communication medium between upstream and downstream communications;
the reallocated upstream bandwidth corresponds to a second bandwidth allocation of the communication medium between upstream and downstream communications; and
the second bandwidth allocation reallocates a portion of downstream bandwidth, from the first bandwidth allocation, to the portion of the reallocated upstream bandwidth.

3. The method according to claim 1, further comprising:
identifying, based one or more messages indicating one or more signal characteristics associated with a plurality of premises, the one or more devices; and
wherein the determining comprises determining, based on the indicated one or more signal characteristics, the one or more modifications.

4. The method according to claim 1, wherein the causing comprises sending, to a switch of the network access device, a control signal to cause the determined one or more modifications.

5. The method according to claim 1, wherein the determining comprises determining the one or more modifications based on one or more signal characteristics associated with the one or more devices, and wherein the one or more signal characteristics comprise one or more of: a signal-to-noise ratio (SNR), a modulation error rate (MER), or a bit-error-rate (BER).

6. The method according to claim 1, wherein the determining comprises determining, by the network access device, one or more of:
a first filter, of a plurality filters associated with a first signal path of the plurality of switchably-filtered signal paths, to be turned on so that signals transmitted via the first signal path are filtered by the first filter;
a second filter, of a plurality of filters associated with a second signal path of the plurality of switchably-filtered signal paths, to be turned off so that signals transmitted via the second signal path are not filtered by the second filter; or
a third signal path, of the plurality of switchably-filtered signal paths, to be interrupted.

7. The method according to claim 1, wherein the causing comprises one or more of:
causing a switch of the network access device to connect an unfiltered first signal path between a first port, associated with a first device of the one or more devices, and a second port associated with one or more distribution devices;
causing the switch of the network access device to connect to a filter of a second signal path between a first port, associated with a second device of the one or more devices, and the second port; or
causing the switch of the network access device to interrupt a third signal path between a first port, associated with a third device of the one or more devices, and the second port.

8. The method according to claim 1, wherein the determining comprises receiving, by the network access device from one or more computing devices, one or more messages indicating one or more of:
a first filter, of a plurality filters associated with a first signal path of the plurality of switchably-filtered signal paths, to be turned on so that signals transmitted via the first signal path are filtered by the first filter;
a second filter, of a plurality of filters associated with a second signal path of the plurality of switchably-filtered signal paths, to be turned off so that signals transmitted via the second signal path are not filtered by the second filter; or
a third signal path, of the plurality of switchably-filtered signal paths, to be interrupted.

9. The method according to claim 1, further comprising:
sending, by the network access device and via a wireless interface of the network access device, indications of one or more signal characteristics, and
wherein the determining comprises receiving, based on the sending the indications and via the wireless interface, indications of the one or more modifications.

10. The method according to claim 1, wherein the determining comprises selecting, by the network access device, a filter based on a band split configuration of a device of the one or more devices.

11. The method according to claim 1, wherein the determining comprises:
determining, by the network access device, that at least two devices, of the one or more devices, form a Multimedia Over Coax Alliance (MoCA) link; and
selecting, by the network access device, a filter based on the determining that the at least two devices form the MoCA link.

12. The method according to claim 1, wherein the one or more modifications comprise one or more of:
turning on or off a filter in a signal path of the plurality of switchably-filtered signal paths; or
interrupting a signal path of the plurality of switchably-filtered signal paths.

13. The method according to claim 1, further comprising:
receiving, from a computing device, a request message indicating one or more signal characteristics associated with the one or more devices; and
sending, to the computing device, one or more indications of the one or more signal characteristics,
wherein the determining comprises receiving, from the computing device and after the sending the one or more indications of the one or more signal characteristics, indications of the one or more modifications.

14. The method according to claim 1, further comprising:
causing the one or more devices to monitor one or more signal characteristics,
wherein the determining is based on the one or more signal characteristics.

15. A method comprising:
sending, by a computing device to a network access device, a request for one or more signal characteristics associated with upstream signals received by the network access device, via a communication medium, after an upstream bandwidth reallocation of the communication medium;
receiving, from the network access device, a first message indicating the one or more signal characteristics;
determining, based on the one or more signal characteristics, one or more modifications to one or more signal paths of a plurality of switchably-filtered signal paths of the network access device; and
sending, to the network access device, a second message configured to cause the network access device to perform the one or more modifications.

16. The method according to claim 15, wherein the determining comprises determining one or more of:
a first filter, of a plurality filters associated with a first signal path of the plurality of switchably-filtered signal paths, to be turned on so that signals transmitted via the first signal path are filtered by the first filter;
a second filter, of a plurality filters associated with a second signal path of the plurality of switchably-filtered signal paths, to be turned off so that signals transmitted via the second signal path are not filtered by the second filter; or
a third signal path, of the plurality of switchably-filtered signal paths, to be interrupted.

17. The method according to claim 15, wherein the sending the request, the receiving the first message, and the sending the second message comprise communicating with the network access device via a wireless interface of the network access device.

* * * * *